3,169,074
RUTILE TITANIUM DIOXIDE PIGMENTS AND
PROCESS FOR THEIR PRODUCTION
Raymond G. Holbein, Thann, Haut-Rhin, France,
assignor to Fabriques de Produits Chimiques de
Thann et de Mulhouse, Thann, France, a corporation of France
No Drawing. Filed Aug. 29, 1961, Ser. No. 134,579
Claims priority, application France Aug. 31, 1960
20 Claims. (Cl. 106—300)

This invention relates to new and improved rutile titanium dioxide pigments and to a process for producing them.

As is known, two types of titanium dioxide pigments now are produced and widely used, namely, pigments in which the $TiO_2$ is crystallized as anatase and pigments in which the $TiO_2$ is crystallized as rutile.

Generally speaking, anatase pigments are whiter, finer, softer and cheaper to prepare than rutile pigments. They are cheaper to prepare particularly because anatase coming out of the calcining kiln may be reduced to a fineness satisfactory for many uses by dry grinding. Rutiles are ordinarily obtained as harder crystal agglomerates that cannot be reduced to satisfactory fineness by dry grinding, except for more limited uses.

On the other hand, rutile pigments have a greater hiding power, are usually more stable towards yellowing, and generally are less susceptible to discoloration by photochemical reactions in the presence of organic substances. In paints exposed to weathering, rutiles are much less susceptible to chalking than anatases, regardless of the nature of vehicle used. These advantages of rutiles are related to the nature of the rutile crystal lattice and to its higher refractive index.

In the sulfuric acid process of producing $TiO_2$ pigments, the ore, such as ilmenite, is attacked by sulfuric acid, the purified titanium sulfate solution is hydrolyzed to hydrous titanium dioxide, and the precipitate is dried and calcined. Either rutile or anatase pigments may be produced, depending upon the conditions of the hydrolysis and the calcination. Since the beginning of the titanium pigment industry it has been recognized that calcining at higher temperatures results in quantitative changes of anatase into rutile. While these higher temperatures increase the stability of the pigment, a sintering takes place during the recrystallization to rutile, and the color, fineness and hiding power of the pigment are adversely affected.

Numerous processes have been proposed heretofore for the purpose of promoting rutilization without adversely affecting the structure or other pigmentary properties of the $TiO_2$, by altering either the conditions of hydrolysis or the conditions of calcination.

For example, by the addition of rutile promoting seeds such as zinc oxide or any of several other substances to the hydrous titanium dioxide before the calcination and then calcining at a temperature (for instance, at about 850° C.) lower than the temperature (i.e., about 950° C.) usually used for the calcination of anatase to rutile, rutile has been obtained in which the original fineness of the hydrous titanium dioxide is preserved to a certain extent. This lowering of the calcination temperature to preserve particle fineness is, however, not very satisfactory, for the higher the temperature at which the $TiO_2$ is calcined, all other conditions being the same, the more compact is the particle structure, the less susceptible it is to undesirable photochemical reactions, and the lower is its oil absorption, all of which properties are quite valuable in $TiO_2$ pigments. The lowering of the calcination temperature has, however, been essential in order to prevent, in the presence of rutilization catalysts or seeds, a sintering of the particles detrimental to the fineness and the color of the product.

The principal object of the present invention is to provide a new and improved type of rutile $TiO_2$.

A more particular object of the invention is to provide rutile $TiO_2$ pigments which possess the desirable properties of whiteness and particle fineness characteristic of anatase pigments together with the desirable properties of density, chemical stability and high hiding power which are characteristic of rutile pigments.

A further object of the invention is to provide a process by which $TiO_2$ can be converted into rutile at a temperature substantially higher than that which is conventionally used to calcine anatase, i.e., at a temperature up to or even exceeding 1,000° C., without causing objectionable sintering or objectionable loss of fineness, color, or other desired pigmentary properties in the product.

Other advantages and features of the invention will become apparent from the description which follows.

It has been found that the above mentioned and other important objects and advantages can be achieved, according to the present invention, by calcining at a temperature of approximately 1,000° C. or higher, until the $TiO_2$ is practically entirely converted into the rutile structure, a precipitated hydrous titanium dioxide which has been produced by the hydrolysis of a titanium sulfate solution and which contains, together: (1) rutile promoting seeds, (2) a small amount of $Al_2O_3$ added as a soluble salt, (3) a small amount of $P_2O_5$, and (4) a small amount of a potassium salt.

More specifically, according to optimum practices of the invention, the calcination is effectuated in the presence of from 1 to 6%, preferably 3 to 5%, of $TiO_2$ particles serving as rutile promoting seeds; from 0.3 to 2.5%, preferably 0.6 to 1.0%, of $Al_2O_3$; from 0.1 to 0.5%, preferably 0.1 to 0.25%, of $P_2O_5$; and from 0.1 to 1.0%, preferably 0.25 to 0.7%, of $K_2O$ present as a potassium salt. Through extensive studies, it has been found that these additional substances act in the process in ways hereinafter indicated and that the use of them in proportions as herein set forth will give the most favorable products according to the invention.

The presence of rutile promoting seeds, i.e., of seeds favoring or inducing the conversion of anatase into rutile during the calcination, enables the conversion to be effected at a temperature lower than that which would cause a sintering of the product and resultant impairment of the pigmentary properties due to too large an increase in the size of the ultimate crystals.

These seeds may be added, as in conventional processes, either to the solution before hydrolysis or to the hydrolyzed product at any stage before the calcination.

According to a further feature of the invention, it has been found especially advantageous to make two distinct rutile-inducing seedings in the course of the process, an addition of rutile promoting $TiO_2$ seeds that give a rutilizing tendency to the hydrolyzate being made to the titanium sulfate solution before the hydrolysis and another addition of rutile promoting $TiO_2$ seeds being made to the hydrolyzate before the calcination. In this way the rutile product is readily obtained with its particles so small and so uniform in size that it develops a definitely bluish undertone, as does anatase, when tested for tinting strength by the use of carbon black according to a conventional method, such as that described in French Standard specifications N.F.T. 30-023. A rutile pigment of this character is not believed to have been known heretofore; nor is it believed to have been recognized previously that valuable improvements of the quality of rutile pigments can be brought about by the use of two distinct seedings, i.e., through a "double seeding" process, as set forth herein.

As examples of suitable rutilizing seeds, but without limitation thereto, the seeds to be added before the hydrolysis may be those obtained according to Example 1 of U.S. Patent No. 2,303,305, while the seeds to be added after the hydrolysis but before the calcination may be those obtained according to claim 1 of U.S. Patent No. 2,427,165.

The chief effect of the alumina added in the present process is to preserve in the pigment a very white color even though the calcination takes places at a temperature of 1,000° C. or higher. The action of alumina in this respect is opposite to that of zinc oxide which has been frequently specified as an agent useful in the conversion of anatase to rutile by calcination. The alumina gives its effect, presumably, by inhibiting sintering that otherwise would result in an increase of the particle size.

Alumina is added to the suspension of $TiO_2$ hydrolyzate, after the washing of the latter, as a solution of an aluminum salt, preferably aluminum sulfate, that afterwards is decomposed at the temperature at which the $TiO_2$ is calcined. The amount added is generally about 0.3 to 2.5% calculated as $Al_2O_3$ in relation to the weight of $TiO_2$. The best hiding power is usually obtained when the amount is approximately 0.8%.

The presence of $P_2O_5$ in the course of the calcination results in the production of rutile which is softer and easier to disintegrate than the product obtained by carrying out the process in the absence of phosphate. It has been found, contrary to what has been generally assumed heretofore, that a small amount of $P_2O_5$ does not interfere with or impede the required rutilization. This important point could not be foreseen.

Since some titanium ores, such as ilmenites, usually contain small amounts of $P_2O_5$ which are found practically entirely in the hydrolyzed $TiO_2$, an addition of $P_2O_5$ may be unnecessary in some cases. Generally, however, it is advantageous to add some $P_2O_5$ to the washed hydrolyzed $TiO_2$. The $P_2O_5$ is added in the same manner as alumina, i.e., as a solution, and the solution advantageously is prepared by dissolving in water a salt, e.g., monoammonium phosphate, which decomposes at the temperature at which the $TiO_2$ is calcined. The proportion of $P_2O_5$ used is generally not more than 0.5% based on the weight of $TiO_2$, and preferably it is in the range of 0.1 to 0.25%.

The presence of $K_2O$ in the course of the calcination also improves the structure of the pigment. More specifically, it enables the product to be discharged from the calciner in a practically neutral or slightly alkaline condition, for instance at a pH of 7.5–7.6. It also contributes to the ability to calcine the hydrolyzate at higher than ordinary calcination temperatures without detriment to the desired properties of the pigment and with an improvement in its stability. The addition of the $K_2O$ is made in the same manner as that of the alumina, namely, to the washed hydrolyzate as a solution of a water soluble potassium compound, for example, 0.4 to 1% by weight of potassium carbonate, amounting by calculation to 0.25 to 0.7% of $K_2O$, based upon the amount of $TiO_2$.

The products according to this invention are obtained by calcining the prepared hydrolyzate in the usual manner but at a temperature higher than is ordinarily used for the calcination of anatase to rutile. For instance, a temperature of 1,000° to 1,100° C. gives excellent rutile pigments according to the invention. The calcination is continued until the conversion to rutile reaches practically 100%. The change of crystal structure occurring during the calcination may be determined by the use of conventional pigment tests and/or by taking X-ray diffraction patterns of samples of the material, so as to enable termination of the heating at the point when the desired conversion to rutile is obtained.

The pH of the material is also checked during the calcination and kept in the vicinity of the neutral point.

The particle size is checked too, by taking samples and determining their tinting strength by the conventional method using carbon black. Carbon black is used, instead of ultramarine, because it has been found that when operating in this manner coarse pigments will show a reddish or brown undertone while very fine pigments will show a bluish undertone. The rutile pigments provided according to the present invention show a bluish undertone, similar to the color obtained with anatase, which is a color tone much preferred by users of $TiO_2$ pigments.

The products of the present invention are new products. As compared to previously known rutiles, they have several advantageous properties which are very important to users, including the following:

(a) A white color
(b) A more bluish and less reddish undertone
(c) Lower oil absorption
(d) Finer texture
(e) Better gloss in paint films
(f) Almost perfect stability against photochemical reactions
(g) Better resistance to weathering when incorporated in paints.

In addition to the foregoing, the new product as it comes out of the calciner is remarkably soft, which enables it to be delivered to customers after a dry grinding which is much cheaper than wet grinding. Wet grinding is usually considered unavoidable for rutile-type pigments and is almost exclusively used by producers. This is a very important economic advantage of the instant invention.

The following examples further illustrate the practice of the invention and the characteristics of the new rutile pigments.

EXAMPLE I

*Seeds added to hydrolyzate*

(a) PREPARATION OF SEEDS FOR CALCINATION

A mixture of 200 grams of $TiO_2$, produced by hydrolysis and washed, and 400 grams of a solution of NaOH containing 600 gr./liter of NaOH was boiled for 4 hours. The precipitate was washed 5 times by repulping and settling. Before the last settling the pH was adjusted to 5.0 by an addition of hydrochloric acid. The suspension was adjusted to 80 grams $TiO_2$ per liter and heated to 60° C. Then 600 grams of 32% hydrochloric acid were added and the suspension brought to a boil in 2 hours. After boiling it for 1 hour, the suspension was allowed to cool. It contained about 67 grams of $TiO_2$ per liter.

(b) HYDROLYSIS

Two liters of a solution prepared by reaction of ilmenite with sulfuric acid, containing

| | Grams/liter |
|---|---|
| $TiO_2$ | 256 |
| Fe | 68.8 |
| Active $H_2SO_4$ (free and bound to $TiO_2$) | 533 | were heated to 97° C. The solution was poured into 350 ml. of water heated to 91° C., under good stirring, at a regular rate during 15 minutes. Then the solution was brought to a boil in 45 minutes and kept boiling for 3 hours. Between 20 and 30 minutes after the end of the pouring of the solution, 100 ml. of water was added during a 10 minute interval. After some cooling the hydrolyzate was filtered, washed and bleached by a conventional titanous acid treatment.

(c) PIGMENTATION

Three hundred grams of the washed hydrolyzate (100 grams of $TiO_2$) were repulped in water and thoroughly mixed with (1) 25 ml. of the prepared suspension of rutile promoting seeds (containing the equivalent of about 1.7 gr. $TiO_2$), (2) 6 grams of an aqueous solution of aluminum sulfate (containing the equivalent of about 0.8 gr. $Al_2O_3$),
(3) 0.3 gram of monoammonium phosphate in aqueous solution (containing the equivalent of about 0.15 gr. $P_2O_5$), and
(4) 0.5 gram of potassium carbonate in aqueous solution (containing the equivalent of about 0.35 gr. $K_2O$).

The resulting mixture was dried and calcined at a temperature of about 1,000° C. until practically a 100% conversion to rutile had occurred, as shown by X-ray examination.

The product obtained was $TiO_2$ practically entirely in the rutile form. It was whiter and less yellow than products obtained by calcination in the presence of zinc oxide and softer than the products calcined without $P_2O_5$.

EXAMPLE II

Double seeding (a) PREPARATION OF SEEDS FOR HYDROLYSIS

A 610 ml. volume of an aqueous solution of $TiCl_4$ containing 200 grams of $TiO_2$ per liter was introduced during 15 seconds into 2,820 ml. of an aqueous solution of caustic soda containing 67 grams of NaOH/liter. The suspension was heated to 85° C. in 40 minutes and kept at this temperature for 30 minutes. Then it was cooled by an addition of 3,430 ml. of cold water, and neutralized to a pH of exactly 7.0 by addition of a caustic soda solution. The precipitate was washed by settling in order to eliminate 75% of the soluble salts. Ultimately 3,700 ml. of a suspension containing 33 grams of $TiO_2$ per liter was obtained.

(b) HYDROLYSIS

Two liters of a solution prepared by reaction of ilmenite with sulfuric acid, containing

| | Grams/liter |
|---|---|
| $TiO_2$ | 244.8 |
| Titanous (as $TiO_2$) | 2.7 |
| Fe | 71 |
| Active $H_2SO_4$ (free and bound to $TiO_2$) | 480.2 | were heated to 95° C. Three hundred seventy ml. of the prepared suspension of seeds were added during 10 minutes, under good stirring, and the solution was then brought to boil in 10 minutes.

After about 30 minutes, when the solution turned gray, 310 ml. of water were added in 10 minutes and the boiling continued. Hydrolysis was carried on for a total period of 4 hours. After some cooling, the hydrolyzate was filtered, washed and bleached by a titanous acid treatment.

(c) PIGMENTATION

Three hundred grams of the washed hydrolyzate (containing 100 grams of $TiO_2$) were repulped in water and thoroughly mixed with (1) 25 ml. of a suspension of rutile promoting seeds prepared as described in Example I (containing about 1.7 grams of $TiO_2$),
(2) 6 grams of hydrous aluminum sulfate in aqueous solution (equivalent to about 0.8 gram $Al_2O_3$),
(3) 0.2 gram of monoammonium phosphate in aqueous solution (equivalent to about 0.1 gram of $P_2O_5$), and
(4) 0.5 gram of potassium carbonate in aqueous solution (equivalent to about 0.35 gram of $K_2O$).

The pulp was dried and calcined at about 1,000° C., while again testing samples by X-ray examination, until the $TiO_2$ content of the product was present practically 100% as rutile.

The product was similar to that obtained in Example I but was even better in quality. When tested with carbon black for tinting strength, it showed a clearly bluish undertone, as do the anatases, proving that the particles were extraordinarily small and uniform in size.

Such a rutile is a very valuable new product. When compared with previously known rutiles, it was found to be lower in oil absorption, to have greater resistance to ultra-violet discoloration, and to give higher gloss in paint or varnish films.

The color of the described pigments has been tested according to French Standard specifications N.F.T. 30–025.

The undertone has been tested by the use of carbon black according to French Standard specifications N.F.T. 30–023.

The oil absorption has been determined according to French Standard specifications N.F.T. 30–022.

The fineness of texture is tested, for example, with a North gauge after mixing the pigment with oil.

The gloss of paint or varnish films containing the pigments has been checked by comparing images of a tungsten lamp filament reflected by the films.

The stability to photochemical reaction has been tested, according to conventional methods, by mixing the pigment with glycerol, mandelic acid or melamine formaldehyde and irradiating the paste, for instance, during one night at a distance of 30 cm. by an ultra-violet lamp of 300 watts.

The resistance to weathering or chalking has been tested either by outside exposure of paints containing the pigments or in devices designed for accelerated chalking tests.

The foregoing specification and examples have set forth numerous particulars to illustrate the practice of the invention but it will be understood that variations, substitutions and omissions may be made without departing from the invention which is intended to be defined by the appended claims.

What is claimed is:

1. Rutile $TiO_2$ pigments consisting essentially of $TiO_2$ particles of rutile crystal structure having the refractive index, hiding power and color stability characteristic of rutile pigments together with the whitness and particle fineness characteristic of anatase pigments said particles showing a bluish undertone upon being tested for tinting strength with the use of carbon black, and being a calcinate of a rutile-induced $TiO_2$ hydrolyzate, and containing as produced 0.3 to 2.5% of $Al_2O_3$, based upon the weight of the $TiO_2$ content of the hydrolyzate.

2. Rutile $TiO_2$ pigments consisting essentially of $TiO_2$ particles of rutile crystal structure having the refractive index, hiding power and color stability characteristic of rutile pigments together with the whiteness and particle fineness characteristic of anatase pigments, said particles being a calcinate of a $TiO_2$ hydrolyzate and containing as produced about 0.3 to 2.5% of $Al_2O_3$ and 0.1 to 0.5% of $P_2O_5$, based upon the weight of the $TiO_2$ content of the hydrolyzate.

3. Rutile $TiO_2$ pigments consisting essentially of $TiO_2$ particles of rutile crystal structure having the refractive index, hiding power and color stability characteristic of rutile pigments together with the whiteness and particle fineness characteristic of anatase pigments, said particles being a calcinate of a $TiO_2$ hydrolyzate and containing as produced about 0.3 to 2.5% of $Al_2O_3$, 0.1 to 0.5% of $P_2O_5$ and 0.1 to 1% of $K_2O$, all percentages based upon the weight of $TiO_2$ in the hydrolyzate.

4. Rutile $TiO_2$ pigments consisting essentially of $TiO_2$ particles of rutile crystal structure having the refractive index, hiding power and color stability characteristic of rutile pigments together with the whiteness and particle fineness characteristic of anatase pigments, said particles being a calcinate of a rutile-induced $TiO_2$ hydrolyzate and containing as produced about 0.6 to 1% of $Al_2O_3$, 0.1 to 0.25% of $P_2O_5$ and 0.25 to 0.7% of $K_2O$, all percentages based upon the weight of $TiO_2$ in the hydrolyzate.

5. A process for the preparation of rutile titanium dioxide pigments, which comprises calcining at a temperature of at least approximately 1,000° C., until the titanium dioxide is converted practically entirely into rutile, hydrous titanium dioxide prepared by the hydrolysis of a titanium sulfate solution and having intimately mixed therewith 1 to 6% of $TiO_2$ seeds that promote the formation of rutile and substances providing in the calcinate 0.3 to 2.5% of $Al_2O_3$, 0.1 to 0.5% of $P_2O_5$, and 0.1 to 1% of $K_2O$, all percentages based upon the weight of $TiO_2$ in the hydrolyzate.

6. A process for the preparation of rutile titanium dioxide pigments, which comprises calcining at a temperature of approximately 1,000° to 1,100° C., until the titanium dioxide is converted practically entirely into rutile, hydrous titanium dioxide prepared by the hydrolysis of a titanium sulfate solution and having intimately mixed therewith 3 to 5% of $TiO_2$ seeds that promote the formation of rutile and substances providing in the calcinate 0.6 to 1% of $Al_2O_3$, 0.1 to 0.25% of $P_2O_5$, and 0.25 to 0.7% of $K_2O$, all percentages based upon the weight of $TiO_2$ in the hydrolyzate.

7. In the production of rutile $TiO_2$ pigments by hydrolyzing a titanium sulphate solution and thereafter calcining the hydrolyzate at temperatures sufficient to convert it into rutile yet sufficiently low to avoid sintering, the improvement which comprises adding to said solution before the hydrolysis rutile-inducing $TiO_2$ seeds whereby the hydrolyzate forms in a condition more amenable to rutization and admixing with the hydrolyzate before the calcination rutile promoting $TiO_2$ seeds in an amount corresponding to 1 to 6% of $TiO_2$ based upon the weight of the $TiO_2$ content of the hydrolyzate.

8. A process for the preparation of improved rutile $TiO_2$ pigments, which comprises intimately admixing with a $TiO_2$ hydrolyzate prepared by the hydrolysis of a concentrated solution of titanium sulfate an aqueous suspension of rutile promoting $TiO_2$ seed in an amount corresponding to 1 to 6% of $TiO_2$ and aluminum compound in aqueous solution in an amount providing 0.3 to 2.5% of $Al_2O_3$ in the calcinate, all percentages based upon the weight of the $TiO_2$ content of the hydrolyzate, and calcining the admixture to rutile at a temperature of at least approximately 1000° C.

9. A process according to claim 8, said seed being a product of the boiling of a reaction product of hydrous $TiO_2$ and NaOH in a hydrochloric acid solution.

10. A process for the preparation of improved rutile $TiO_2$ pigments, which comprises hydrolyzing a concentrated solution of titanium sulfate in the presence of rutile promoting $TiO_2$ seed, intimately admixing with the hydrolyzate an aqueous suspension of rutile promoting $TiO_2$ seed in an amount corresponding to 1 to 6% of $TiO_2$ and aluminum compound in aqueous solution in an amount providing 0.3 to 2.5% of $Al_2O_3$ in the calcinate, all percentages based upon the weight of the $TiO_2$ content of the hydrolyzate, and calcining the admixture to rutile at a temperature of at least approximately 1000° C.

11. A process according to claim 10, said first mentioned seed being a nucleating product of the hydrolysis of $TiCl_4$ in a solution of alkali.

12. A process according to claim 10, said first mentioned seed being a nucleating product of the hydrolysis of $TiCl_4$ in a solution of alkali, and said second mentioned seed being a product of the boiling of a reaction product of hydrous $TiO_2$ and NaOH in a hydrochloric acid solution.

13. A process for the preparation of improved rutile $TiO_2$ pigments, which comprises intimately admixing with a $TiO_2$ hydrolyzate prepared by the hydrolysis of a concentrated solution of titanium sulfate an aqueous suspension of rutile promoting $TiO_2$ seed in an amount corresponding to 1 to 6% of $TiO_2$ and metal salts in aqueous solution in amounts such that the calcinate will contain 0.3 to 2.5% of $Al_2O_3$, 0.1 to 0.5% of $P_2O_5$ and 0.1 to 1% of $K_2O$, all percentages based upon the weight of the $TiO_2$ content of the hydrolyzate, and calcining the admixture to rutile at a temperature of at least approximately 1000° C.

14. A process according to claim 13, the amount of said seed corresponding to 3 to 5% of $TiO_2$.

15. A process according to claim 13, the amounts of said salts being such that the calcinate will contain 0.6 to 1% of $Al_2O_3$, 0.1 to 0.25% of $P_2O_5$ and 0.25 to 0.7% of $K_2O$.

16. A process according to claim 13, said seed being a product of the boiling of a reaction product of hydrous $TiO_2$ and NaOH in a hydrochloric acid solution.

17. A process for the preparation of improved rutile $TiO_2$ pigments, which comprises hydrolyzing a concentrated solution of titanium sulfate in the presence of rutile promoting $TiO_2$ seed, intimately admixing with the hydrolyzate an aqueous suspension of rutile promoting $TiO_2$ seed in an amount corresponding to 1 to 6% of $TiO_2$ and metal salts in aqueous solution in amounts such that the calcinate will contain 0.3 to 2.5% of $Al_2O_3$, 0.1 to 0.5% of $P_2O_5$ and 0.1 to 1% of $K_2O$, all percentages based upon the weight of the $TiO_2$ content of the hydrolyzate, and calcining the admixture to rutile at a temperature of at least approximately 1000° C.

18. A process according to claim 17, said first mentioned seed being a nucleating product of the hydrolysis of $TiCl_4$ in a solution of alkali, and said second mentioned seed being a product of the boiling of a reaction product of hydrous $TiO_2$ and NaOH in a hydrochloric acid solution.

19. A process according to claim 17, the amount of said calcinate rutilizing seed corresponding to 3 to 5% of $TiO_2$.

20. A process according to claim 17, the amounts of said salts being such that the calcinate will contain 0.6 to 1% of $Al_2O_3$, 0.1 to 0.25% of $P_2O_5$ and 0.25 to 0.7% of $K_2O$.

References Cited in the file of this patent

UNITED STATES PATENTS

| | | |
|---|---|---|
| 2,571,150 | Mayer | Oct. 16, 1951 |
| 2,576,434 | Ancrum | Nov. 27, 1951 |
| 2,668,776 | Miller | Feb. 9, 1954 |
| 2,766,133 | Marcot et al. | Oct. 9, 1956 |
| 2,771,345 | Tanner | Nov. 20, 1956 |

UNITED STATES PATENT OFFICE
CERTIFICATE OF CORRECTION

Patent No. 3,169,074                            February 9, 1965

Raymond G. Holbein

It is hereby certified that error appears in the above numbered patent requiring correction and that the said Letters Patent should read as corrected below.

Column 8, line 44, for "calcinate rutilizing" read -- second mentioned --.

Signed and sealed this 27th day of July 1965.

(SEAL)
Attest:

ERNEST W. SWIDER
Attesting Officer

EDWARD J. BRENNER
Commissioner of Patents